(No Model.) 2 Sheets—Sheet 1.
M. G. HUBBARD.
CAR TRUCK.
No. 450,157. Patented Apr. 14, 1891.
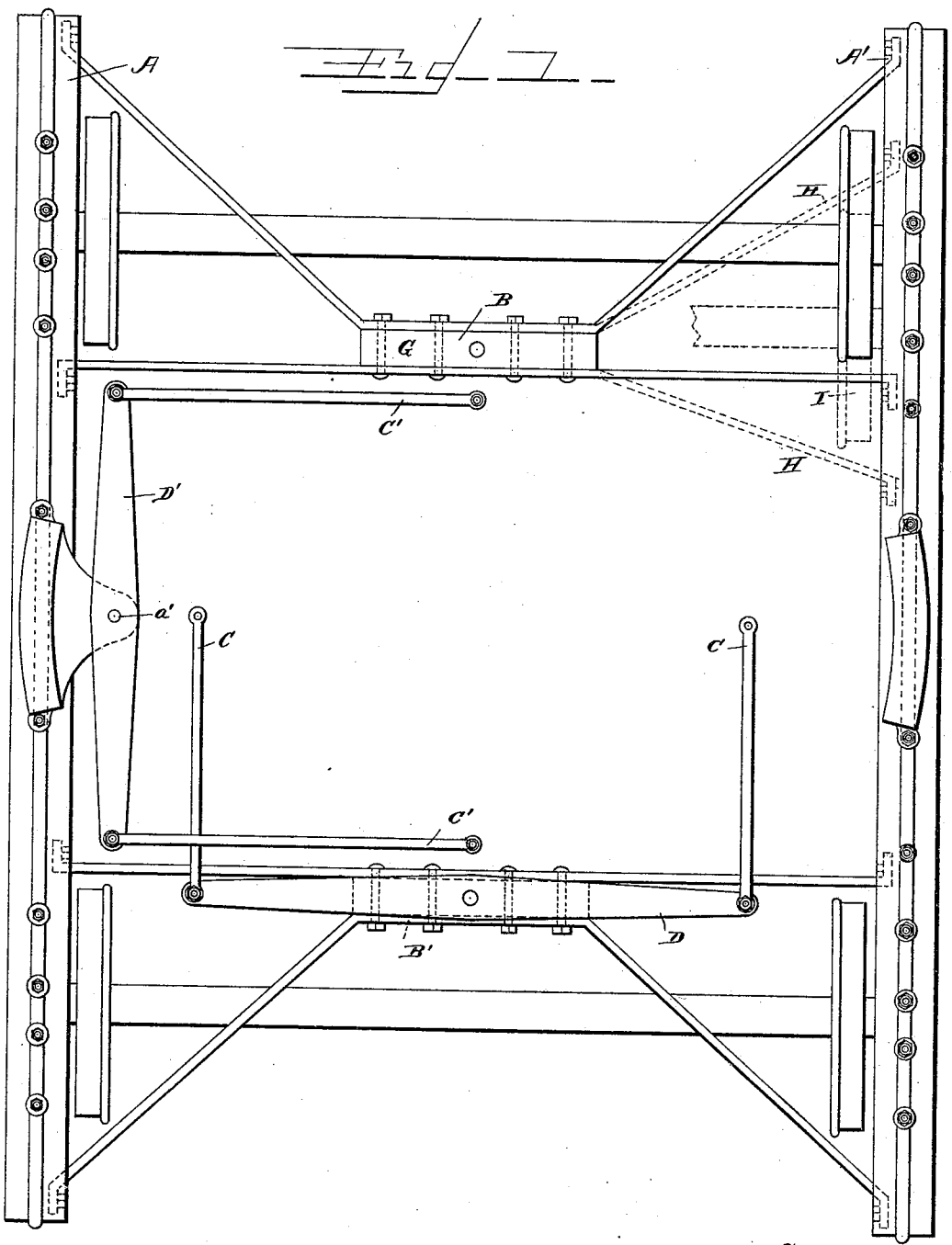
Witnesses:
Rex. M. Smith.
Jas. K. McCathran
Inventor:
Moses G. Hubbard,
By A. M. Smith & Son.
Attorneys.

(No Model.)  M. G. HUBBARD.  2 Sheets—Sheet 2.
CAR TRUCK.
No. 450,157.  Patented Apr. 14, 1891.
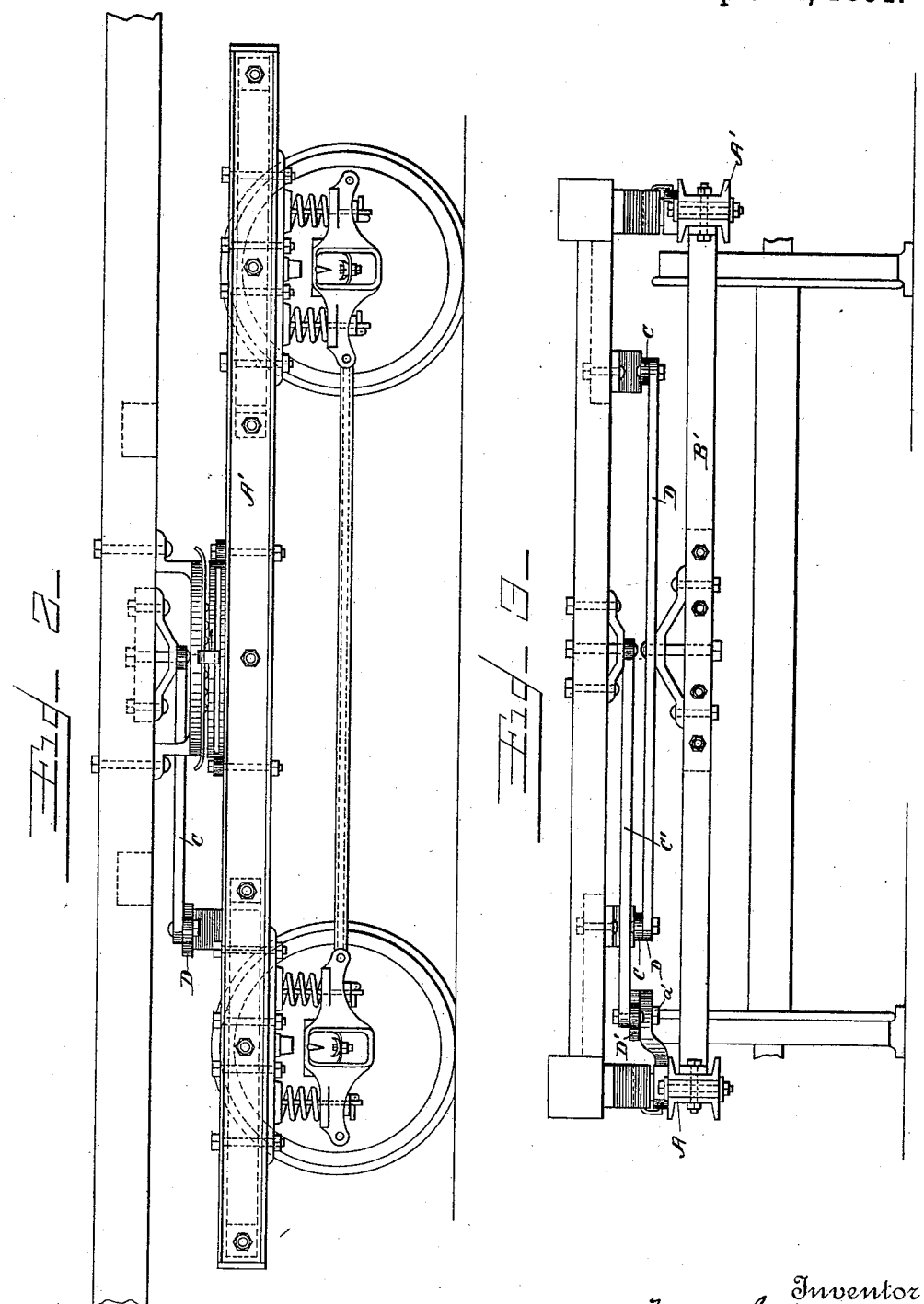
Witnesses:
Rex. M. Smith.
Jas. L. McCachran.
Inventor:
Moses G. Hubbard,
By A. M. Smith & Son,
Attorneys.

UNITED STATES PATENT OFFICE.

MOSES G. HUBBARD, OF CHICAGO, ILLINOIS.

CAR-TRUCK.

SPECIFICATION forming part of Letters Patent No. 450,157, dated April 14, 1891.

Application filed February 18, 1890. Serial No. 340,865. (No model.)

*To all whom it may concern:*

Be it known that I, MOSES G. HUBBARD, a citizen of the United States, and a resident of Chicago, county of Cook, and State of Illinois, have invented a new and useful Improvement in Car-Trucks, of which the following is a full, clear, and exact description, reference being had to the accompanying drawings, making part of this specification.

My invention consists in a new construction and arrangement of a car-truck adapted to a grip or other motor, having its central portion open and unobstructed.

In my cable trucks, in use experimentally in Philadelphia, the front end of the car-body is carried on a system of parallel or jointed bars connecting the front truck with the car-body around or outside of the pivotal center of motion of the truck, whereby the king-bolt and center plate are dispensed with and a central or open space left at such place, special or separate side bearings being used underneath the ends of the transverse bars. The said jointed-bar connection is employed, if desired, to support the car; but the primary action of said connection is to tie the car in a central position relatively to the truck and to provide for the turning or swiveling of the truck around a central pivotal point or axis within said jointed-bar connection.

The object of my present invention is to provide a more simple, cheaper, and better construction and attachment of the truck to the car-body, as hereinafter described. It will be more clearly understood by reference to the accompanying drawings, forming a part of this specification, in which—

Figure 1 is a top view of my improved truck. Fig. 2 is a side view thereof, and Fig. 3 is an end view of the same.

In Fig. 1, A A' are the wheel-pieces of the truck-frame.

B and B' are bifurcated cross-sills uniting the wheel-pieces and which will be more fully described herein.

C C are the draft-links similar to those patented by me September 22, 1885, No. 326,652, and C' C' indicate a similar pair of links.

D is an equalizing-lever pivoted at *a* to the front cross-sill of the truck-frame, and D' is an equalizing-lever pivoted at *a'* to one of the wheel-pieces. The draft-links (lettered C C) are pivoted to the front equalizing-lever at one end and to the under side of the car at their other ends, and those lettered C' C' are pivoted to the side equalizing-bar at one end and to the under side of the car at their other ends.

The weight of the car-body is supported directly on the wheel-pieces upon my anti-friction outer bearings, more fully described in my patent therefor, dated September 7, 1886, No. 348,741; or any other outer bearing desired may be substituted therefor.

The draft-links to obtain a perfect result should be pivoted to the car-body on a line with the central point around which it is desired that the truck shall turn, and when so pivoted the centering or turning of the truck will be perfect without reference to the comparative length of each pair of draft-links, and the weight of the car-body, when supported upon my said anti-friction outer bearings, does not add perceptibly to the frictional resistance on the truck in curving, because the joints which connect the truck to the car-body are relieved from its weight by the said anti-friction outer bearings.

The bifurcated cross-sills B B' are composed of two flat bars of iron standing edgewise and bolted to the wooden piece G between them, from which they spread in proper form to embrace the car-wheels and to locate the center of the sill or the wheels whenever desired, their ends being firmly secured to the wheel-pieces. When a long wheel base-truck is desired, these bars may be formed as shown; but if a shorter wheel-base is desired, both of the said bars may be bent, as shown by the dotted lines H H, and the wheels located with reference to the center of the truck, as shown at I. The bracing position of the bars of which the bifurcated cross-sills are composed forms a very strong truck diagonally and in all directions, and it will be observed that as the whole draft of the car comes upon the center of the front one when it draws the car by the draft-links its strong braced construction is important.

In my present invention the car is pivoted to the truck at four points, two of which receive the wear due to the draft of the car longitudinally thereof and the other two receive the wear due to lateral forces, and as these two sources of wear would be about equal, the durability of the pivoted points or attachments of the car to the truck in my present invention would be about double the durability of the pivotal attachment of the car to the truck in my previous plan above referred to.

The weight of my present device would be very much less, and as it would be so much cheaper and curve so much easier than my said previous plan, my present invention as a whole I consider very much superior to the former construction referred to.

Having thus described my invention, what I claim as new, and desire to secure by Letters Patent, is—

1. In a car-truck having an open center, the combination of a pivoted equalizing-lever and a pair of draft-links for connecting and controlling the car and truck longitudinally, an equalizing-lever, and a pair of transverse links for connecting and controlling the car and truck transversely, and anti-friction outer bolster-bearings for supporting the car-body vertically, substantially as described.

2. In a cable or motor car, longitudinal draft-links and transverse links arranged in pairs and all connected at one end to equalizing-levers and at the other to the car body or truck, substantially as and for the purpose described.

3. The combination of the bifurcated cross-sills and the wheel-pieces, whereby greater strength of the truck and economy and convenience of construction are attained, substantially as described.

In testimony whereof I have hereunto set my hand this 18th day of February, A. D. 1890.

MOSES G. HUBBARD.

Witnesses:
REX M. SMITH,
EWELL A. DICK.